Patented May 13, 1947

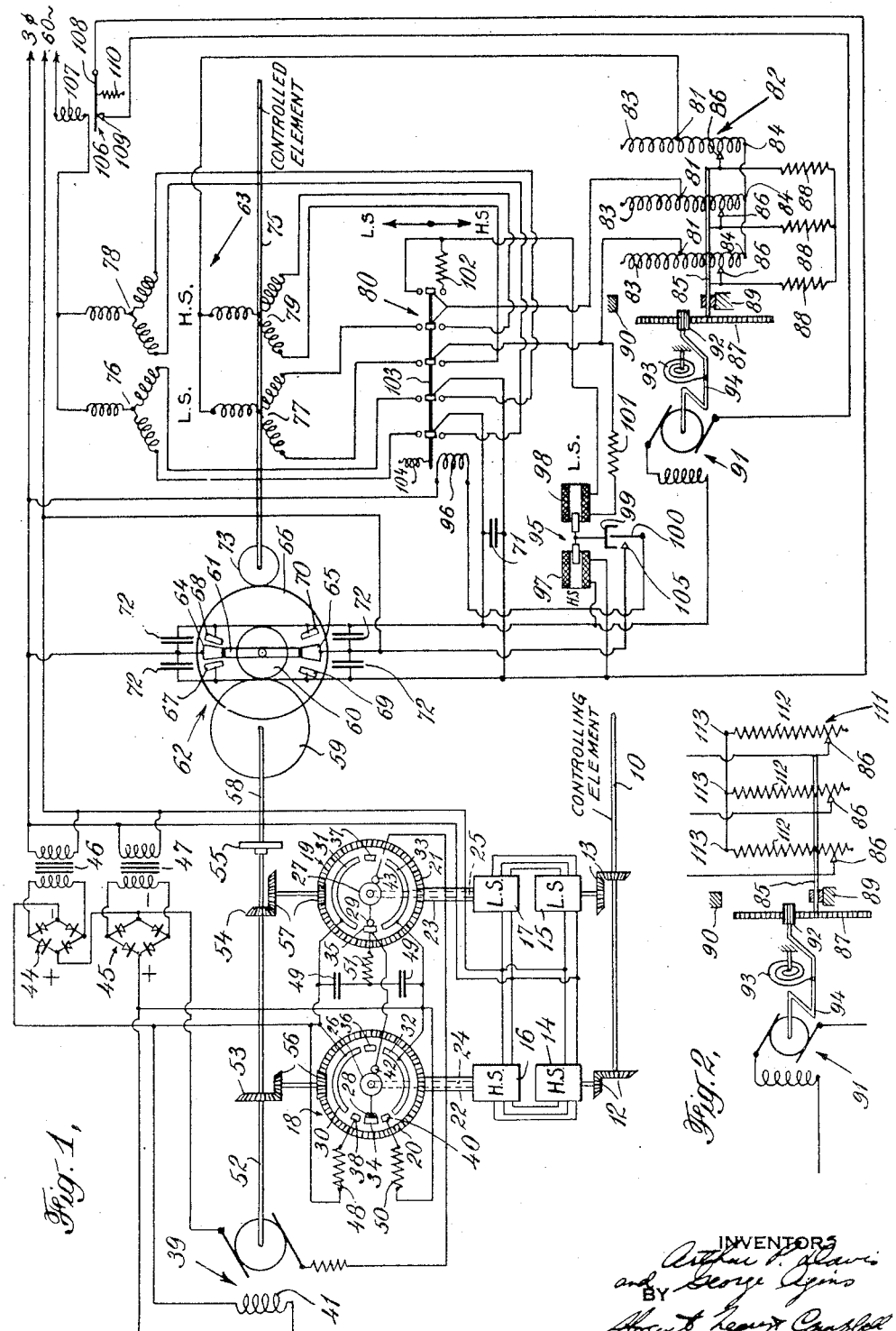

2,420,467

UNITED STATES PATENT OFFICE 2,420,467

SELF-SYNCHRONOUSLY CONTROLLED INDUCTION MOTOR FOLLOW-UP APPARATUS

Arthur P. Davis, Stamford, Conn., and George Agins, Brooklyn, N. Y., assignors to Arma Corporation, Brooklyn, N. Y., a corporation of New York Application February 10, 1939, Serial No. 255,752

21 Claims. (Cl. 172—239)

The present invention relates to control systems and has particular reference to follow-up control systems in which a local or remote controlled element may be instantaneously driven at a rate of speed and through a distance of angle corresponding to the rate and extent of movement of a controlling element.

All of the advantages of electronic follow-up control systems are realized in the system of the present invention while eliminating their disadvantages, to the end that a rugged, non-hunting system is provided, which is readily adaptable to various uses where it is desired to accurately and rapidly position one or more light or heavy controlled elements in accordance with the movements of a local or remote controlling element.

The control system of the present invention includes a reversing switching mechanism, one member of which is driven by a relatively low torque pilot motor controlled by the controlling element, and the other member of which is operatively connected to a two speed, two winding, wound rotor induction type drive motor, whose acceleration should preferably be greater than that of the pilot motor, and which is controlled by the contacts of the reversing switching mechanism.

The reversing switching mechanism controls the direction of rotation of the drive motor, which tends to de-energize itself by opening the contacts of the reversing switching mechanism. The speed and acceleration of the drive motor are governed by the load of the controlled element, and by the intermittent contact action of the reversing switching mechanism, in conjunction with the operation of the drive motor control equipment which changes the electrical connections from either set of drive motor windings to the other set, and also changes the resistance of the drive motor rotor circuit. The drive motor also drives the controlled element which accordingly responds instantaneously to all movements of the controlling element.

The two speed, two winding, wound rotor induction type drive motor used in conjunction with the control apparatus of this invention is desirable because for a specified torque at low motor speeds, less current will be used by the low speed windings of the drive motor, than by the windings of a single speed, one winding motor, in which the windings are equivalent to the high speed windings of the drive motor.

For a more complete understanding of the invention, reference may be had to the accompanying drawings, in which:

Figure 1 is a schematic diagram of a control system constructed in accordance with this invention;

Fig. 2 is a schematic diagram of that portion of the control system which has been modified by substituting a rheostat control for the autotransformer control of the driving motor.

Referring to Figure 1 of the drawings, the controlling element, located at a local or remote station, may be a driven shaft 10, as shown, or other controlling device, which through gearing 12 and 13, actuates the rotors of respective high and low speed self-synchronous rotary induction transmitters 14 and 15. Located at the local or remote station of the controlled element, which may be a shaft 75 connected to any heavy or light object, for driving the same, are respective high and low speed self-synchronous rotary induction receivers 16 and 17, which are electrically connected respectively to the corresponding high and low speed transmitters 14 and 15, so that the rotors of the receivers are in positional agreement with the rotors of the corresponding transmitters at all times. The two receivers 16 and 17 are equipped with follow-up heads 18 and 19, the contacts of which control a suitable pilot motor 39.

The two follow-up heads 18 and 19 include respective gears 20 and 21, which are coaxially journalled to the ends of stationary sleeves 22 and 23, mounted on the frames of the respective receivers 16 and 17. The shaft extensions 24 and 25 of their rotors are free to turn within the corresponding sleeves. The slip rings 26 and 27, and trolley arrangements 28 and 29, are fastened securely to the ends of the corresponding rotor shaft extensions 24 and 25 and are insulated therefrom.

Securely fastened to gear 20 is a disc of insulating material upon which are mounted two long contact segments 30, 32, and four short contact segments 34, 36, 38, 40, insulated from each other and positioned as shown in the illustration so that short segments 34 and 36 are diametrically opposite each other. A short segment 34 lies between short segments 38 and 40, while long segment 30 is positioned between short segments 38 and 36, and long segment 32 is positioned between short segments 40 and 36. Securely fastened to gear 21 is a disc of insulating material upon which are mounted two long contact segments 31, 33, positioned diametrically opposite each other. Two short contact segments 35, 37 are positioned diametrically opposite each other between the ends of the long segments, with all four contact segments insulated from each other.

Contact rollers or brushes 42 and 43 are held at light pressure against the corresponding slip rings 26 and 27 at all times. A double trolley contactor 28 on high speed follow-up head 18, and a single trolley contactor 29 on low speed follow-up head 19, are held at light pressure against the contact segments. The width of the double trolley 28 is such in relation to the length of the short segments 34, 36, 38, 40, as to make the effective gap on either side of its central position very short.

Pilot motor 39 is a direct current motor of the reversible type, whose field 41 is separately excited by rectifier bridges 44 and 45 of any well known type, which receive their power from transformers 46 and 47. In order to provide two steps of acceleration for pilot motor 39 in the operation of follow-up head 18, resistor 48 is interposed in the circuit to segment 38, and resistor 50 is interposed in the circuit to segment 40.

The long segments of the two follow-up heads 18 and 19 are electrically connected to the rectifier bridges 44 and 45. The upper long segments 30 and 31 are both connected to the negative potential output of rectifier bridge 44, and the lower long segments 32 and 33 are both connected to the positive potential output of rectifier bridge 45. Condensers 49 with protective resistance 51, are electrically connected across the contacts of the follow-up heads for spark suppression. The external electrical connections to the long and short contact segments of both follow-up heads 18 and 19 are made through brushes and contact rings which are not shown in the illustration.

The pilot motor shaft 52 carries gears 53 and 54, and mechanical filter 55. The mechanical filter tends to absorb irregularities in the system and may be of any well known type, such as that described in greater detail in copending application Serial No. 115,488, filed December 12, 1936. Gear 53 drives gearing 56 to rotate gear 20 of high speed follow-up head 18, while gear 54 drives gearing 57 to rotate gear 21 of low speed follow-up head 19. The gear ratios and electrical connections between pilot motor 39 and high speed and low speed follow-up heads 18 and 19 are such that when the armature of the pilot motor 39 is energized by a displacement of trolleys 28 and 29, gear 20 will be driven in the same direction and through the same angle as made by trolley 28, while gear 21 will be driven in the same direction and through the same angle as made by trolley 29. Therefore, when gears 20 and 21 have turned through the same angles as their respective trolleys 28 and 29, the follow-up heads 18 and 19 will be in their neutral positions with the armature of pilot motor 39 de-energized, so that in effect, when the pilot motor is running it acts to de-energize itself by opening the contacts of the follow-up heads.

The output side of the mechanical filter 55 is secured to shaft 58 which carries gear 59. Gear 59 drives gear 60 which carries contact arm member 61 of reversing switching mechanism 62. Damping means, not shown, but preferably of the type illustrated and described in the aforementioned copending application, are interposed between gear 60 and contact arm 61. The reversing switching mechanism controls the power input and the direction of rotation of drive motor 63. Two contacts, 64 and 65, are mounted at the extremities of contact arm 61 and are insulated from the arm and from each other. Gear 66, coaxially mounted with gear 60, is free to turn independently of the latter and carries a disc of insulating material upon which are mounted two contacts, 67 and 68, adapted to cooperate with contact 64, and two other contacts, 69 and 70, adapted to cooperate with contact 65.

In the neutral or disengaged position of the reversing switching mechanism 62, a smaller air gap is provided between contacts 64 and 67, 64 and 68, than there is between contacts 65 and 69, 65 and 70, as illustrated in exaggerated form in Figure 1. The contacts 67 to 70 are spring mounted, preferably as shown in said copending application, so that when contact 64 engages contact 67, for example, and the transmitted force of gear 60 necessitates further turning of the arm 61, the spring contact 67 will be compressed sufficiently to allow contact 65 to engage contact 70. Similarly, if gear 60 is turned in the opposite direction with the same force, contact 64 will engage contact 68, and then contact 65 will engage contact 69. This is done to provide directly two steps of acceleration for drive motor 63. The first step of acceleration of drive motor 63 is split phase starting, effected by condenser 71, which is electrically connected to contacts 67, 69, and 68, 70, and the second acceleration step is the application of full stator voltage to the motor. Condensers 72 are connected across the contacts of the reversing switching mechanism 62 for spark suppression. Further details of construction of the reversing switch mechanism are illustrated and described in said copending application.

Mounted on one end of the rotor shaft of drive motor 63 is a gear 73 which meshes with gear 66 of reversing switching mechanism 62. The ratio between gears 66 and 73, and the electrical connections to drive motor 63, are such that the turning of the rotor tends at all times to rotate gear 66 in the same direction and through the same angle as gear 60. When gear 66 has so turned, the contacts of the reversing switching mechanism 62 will have returned to the disengaged position, thereby de-energizing drive motor 63, so that, in effect, the drive motor 63 tends to de-energize itself by opening the contacts of the reversing switching mechanism. The shaft 75 of the drive motor 63 is the controlled element, and may in turn be connected to any light or heavy object for driving the same.

Drive motor 63 consists essentially of a low speed primary or stator winding 76 with its secondary or wound rotor winding 77, and a high speed primary or stator winding 78 with its secondary or wound rotor winding 79. While drive motor 63 is shown and described with two separate stator windings 76, 78, the same result could be obtained by using a single stator winding which has connections by means of which the number of poles may be varied for high speed or low speed operation.

Relay 80 is provided to connect and transfer drive motor stator windings 76 and 78 to the contacts of member 66 of reversing switching mechanism 62, and to connect and transfer drive motor rotor windings 77 and 79 to the midpoint 81 of auto-transformer 82.

Auto transformer 82 consists essentially of three independent windings 83 connected in Y relation at 84, and a movable contact arm 85 which is equipped with contact brushes 86 to engage the taps of windings 83. Contact arm 85 is secured to gear 87 so as to rotate therewith. Windings 83 and gear 87 are shown in the illustration in developed form for purposes of clear illustration, but it is to be understood that they would preferably be of circular construction. The outer ends of the Y connected resistors 88 are connected to contact brushes 86. Stop 89 is provided to limit the minimum voltage position of contact brushes 86, while stop 90 is provided to limit the maximum voltage position of contact brushes 86, both stops being positioned to engage contact arm 85 at said limiting position.

Control motor 91 is a small series type alternating current torque motor which is electrically connected to the contacts of the reversing switching mechanism 62 so as to be energized upon engagement of said contacts. The armature shaft extension of control motor 91 is connected to the shaft of bail 94, and the opposite end of the shaft of bail 94 is connected to gear 92, the said gear being adapted to mesh with gear 87 of autotransformer 82.

Cooperating with control motor 91 is a preloaded spiral spring 93, the inner end of which is secured to a stationary support, and the outer end of which is fastened in a suitable manner to bail 94. Due to the preloading, the initial tension of spring 93 being large compared to the increase of tension encountered during operation, its restoring force will be approximately constant for all positions of the auto-transformer contact arm 85. Therefore, the means for changing taps on auto transformer 82 will tend to adjust itself so that when the drive motor 63 is running, the ratio of the engaged time to the disengaged time of the reversing switching mechanism 62 contact action will be constant for all constant speed and constant torque conditions, and is independent of the speed or torque of the drive motor. In the de-energized condition of the system, the restoring force of spring 93 will hold the auto-transformer contact arm 85 against the minimum voltage stop 89.

Magnet 96 of relay 80 is controlled by solenoidal type switch 95, which consists essentially of two solenoids 97, 98, and their respective armatures. Both armatures are aligned, and their outer ends are connected together and to a yoke 99 for actuating the contact bar 100. Solenoid 97 is electrically connected to the contacts of the reversing switching mechanism 62 so as to be energized upon engagement of the reversing switching mechanism contacts. Solenoid 98 is electrically connected to contacts of relay 80 so as to be energized by one phase of the selected rotor circuit of drive motor 63. Resistor 101 is interposed in the circuit of solenoid 98 to make the operation of the solenoid 98 independent of the frequency of the drive motor rotor voltage.

Five contacts are mounted on contact arm 103, insulated from each other and positioned to engage the corresponding "low speed" and "high speed" contacts. When relay 80 is in the de-energized condition, spring 104 will cause contact arm 103 to remain in engagement with the "low speed" contacts, and when magnet 96 is energized by solenoidal type switch 95, contact arm 103 will disengage the "low speed" contacts and engage the "high speed" contacts.

Assuming that the control system illustrated in Figure 1 of the drawings is in its normal de-energized condition, the controlled element 75 being in positional agreement with the controlling element 10, rotation of the controlling element 10 will be transmitted through gearing 12 and 13 to the rotors of the high and low speed transmitters 14 and 15. The resultant rotation of the rotors thereof in a corresponding direction and angle will result in an equal and substantially simultaneous movement of the rotors of respective high and low speed receivers 16 and 17. The double trolley 28 of high speed follow-up head 18 will accordingly be displaced to engage either segment 38 or segment 40, depending upon the direction of rotation of the controlling element 10. This will effect energization of the armature of pilot motor 39, and cause it to rotate gears 20 and 21 in the appropriate direction, until the follow-up heads 18 and 19 are again in the neutral position.

The rotation of the pilot motor 39 will also be transmitted by its shaft 52 through mechanical filter 55, to shaft 58 and gear 59. The rotation of gear 59 will be transmitted through gear 60 to actuate contact arm 61 of reversing switching mechanism 62. Depending on the direction of rotation of the controlling element 10, the contact 64 of contact arm 61 will engage the cooperating contact, either 67 or 68, which will effect split phase energization of low speed stator winding 76 of drive motor 63, and will thereby start the drive motor. If split phase operation does not cause the drive motor to accelerate quickly enough to follow rapid movements of the controlling element 10, the pilot motor 39 will impart additional movement to the contact arm 61 of reversing switching mechanism 62, so that the other contact, 65, on contact arm 61, will engage either cooperating contact 70 or 69, and thereby supply full phase energization to the low speed stator winding 76 of drive motor 63. Engagement of the contacts of the reversing switching mechanism will also energize control motor 91, and solenoid 97.

When the average value of the voltage applied to control motor 91 by the intermittent contact action of the reversing switching mechanism 62 reached a point which causes the torque of control motor 91 to be greater than the restoring force of spring 93, the control motor 91 will drive the contact arm 85 of auto-transformer 82 away from the minimum voltage stop 89, thereby decreasing the resistance in the rotor circuit of drive motor 63 by decreasing the ratio of transformation from the primary to the secondary windings of the auto-transformer 82, so that a resulting increase in rotor current will be obtained, which increases the torque of the drive motor 63 by a proportional amount.

The low speed windings 76 and 77 will therefore cause the drive motor 63 to accelerate until the controlled element 75 is in positional agreement with the controlling element 10. In the case where speeds greater than the synchronous speed of the low speed windings are necessary, the drive motor 63 will accelerate until it approaches the synchronous speed of the low speed windings, where at a predetermined speed, magnet 96 of relay 80 will be energized by the operation of solenoidal switch 95, and contact arm 103 will substantially instantaneously disengage the low speed contacts to engage the high speed contacts of relay 80, thus disconnecting the low speed stator winding 76 and rotor winding 77 from the circuit, and connecting the high speed stator winding 78 and rotor winding 79 to the circuit in their place.

The construction and adjustment of solenoidal type switch 95 is such that, while at the start of operation of the control system of this invention, the engagement of the contacts of the reversing switching mechanism 62 energizes both the low speed stator winding 76 of drive motor 63 and solenoid 97, and also causes solenoid 98 to be energized from the rotor winding 77 of drive motor 63, the magnetic force which acts on the armature of solenoid 98 will be greater than the magnetic force which acts on the armature of solenoid 97, so that both solenoid armatures tend to assume a position where contact bar 100 is out of engagement with contact 105, and therefore magnet 96 of relay 80 will not be energized. As the drive motor 63 accelerates, the voltage produced in its rotor winding 77 decreases to values which are proportional to the slip of the motor, and when the speed of the drive motor 63 approaches the predetermined speed where transfer from the low speed to the high speed windings of the drive motor should occur, the magnetic force which acts on the armature of solenoid 98 will have decreased to a value where it can no longer overcome the magnetic force acting on the armature of solenoid 97, so that both solenoid armatures tend to assume a position where the contact bar 100 engages its contact 105, thus energizing magnet 96 of relay 80. The voltage ratios of the drive motor windings, and the predetermined speed at which the transfer of the windings occurs can be so chosen that any desired drive motor speed and torque combination can be obtained. After the operation of the drive motor 63 has been switched to the high sped windings 78 and 79, it will accelerate and drive the controlled element 75 into positional agreement with the controlling element 10.

Since the control motor 91, and the selected stator winding of drive motor 63 are energized simultaneously by the contacts of the reversing switching mechanism 62, all torque and speed requirements imposed on the drive motor will also be reflected in the operation of the control motor. For example, if during the operation of the system additional speed or torque is required from the drive motor, the ratio of the engaged time to the disengaged time of the reversing switching mechanism contact action will increase. This will increase the average value of the voltage applied to the control motor and to the stator winding of the drive motor, thereby increasing the torque of the control motor and causing it to drive the contact arm 85 of auto transformer 82 away from the Y point 84. Movement of the contact arm 85 of the auto-transformer 82 away from the Y point will decrease the resistance in the drive motor rotor circuit, thereby increasing the torque of the drive motor 63.

When the drive motor 63 attains the required speed or torque, the ratio of the engaged time to the disengaged time of the reversing switching mechanism 62 contact action will decrease to the constant value for conditions of unchanging speed and torque. This decreases the torque produced by the control motor 91 to a value equal in force but opposite in sense to the restoring force of preloaded spring 93, so that the resultant force acting upon the contact arm 85 of autotransformer 82 is zero, and therefore the contact arm 85 will remain at this setting until the control motor 91 is again affected by changes in the contact action of the reversing switching mechanism 62.

Whenever the contact action ratio of the reversing switching mechanism decreases to a value lower than the constant value for conditions of unchanging speed and torque of the drive motor, the torque produced by the control motor 91 will decrease to a value which is less than the restoring force of spring 93, so that the spring 93 will drive the contact arm 85 of the auto transformer 82 toward the Y point 84, which increases the resistance of the drive motor rotor circuit, and thereby decreases the torque of the drive motor 63. Under all conditions, the contact arm 85 of auto transformer 82 will come to rest when a balance is reached between the torque of the control motor 91 and the restoring force of preloaded spring 93, or when either stop 89 or stop 90 is engaged.

If, in the operation of high speed follow-up head 18, the engagement of double trolley 28 with either segment 38 or segment 40 does not cause pilot motor 39 to accelerate quickly enough to follow rapid movements of the controlling element 10, the double trolley 28 will advance until it is in contact with either long segment 30 or 32, depending upon the direction of rotation of the controlling element 10. Depending upon the extent of movement of double trolley 28, the resistors 48 or 50, which were interposed in the armature circuit of pilot motor 39, will be either short circuited or disconnected, thereby providing maximum acceleration for the pilot motor 39.

If, for some reason, the controlled element 75 is unable to follow rapid movement of the controlling element 10 and the elements become displaced more than a permissible amount, trolley 29 of low speed follow-up head 19 will advance to a point where it no longer makes contact with short segment 35 and will thereby disconnect double trolley 28 of high speed follow-up head 18 from the circuit, so that the high speed follow-up head 18 is deprived of control and control is assumed by low speed follow-up head 19. When angular correspondence between elements 10 and 75 is again approximated, trolley 29 will again move into engagement with segment 35, thus restoring control to high speed follow-up head 18.

When the system is in operation with the controlled element 75 in positional agreement with the controlling element 10, slow decelerations thereof will cause the contacts of the reversing switching mechanism 62 to quickly change to the position for reverse operation of the drive motor 63, thus reversing the phase sequence of the voltage applied to the drive motor stator winding. This will brake the drive motor 63 to the required speed, at which point the contacts of the reversing switching mechanism 62 are changed back to the position for normal operation of the drive motor so that the controlled element 75 tends to keep in positional agreement with the controlling element 10. When electromagnet 96 of relay 80 is energized, resistor 102 is electrically connected in series with solenoid 98 of switch 95. The value of resistor 102 is so chosen that for normal operating decelerations of the controlling element, the operation of the drive motor 63 will be switched from the high speed to the low speed windings at a desirable drive motor speed, the transfer point being determined by the value of the resistor.

Stopping or reversing the direction of rotation of the controlling element when the system is in operation will reverse the phase sequence of the voltage which is applied to the drive motor stator, and thereby cause braking of the drive motor 63 in the same manner as described in the case of slow decelerations of the controlling element. When the phase sequence of the voltage is reversed, the voltage which is produced in the drive motor rotor instantly increases. If the drive motor 63 is operating on the high speed windings when this occurs, the rotor voltage will cause the magnetic force which acts on the armature of solenoid 98 to overcome the magnetic force acting on the armature of solenoid 97, so that the contacts of solenoidal type switch 95 will open and de-energize magnet 96 of relay 80, thereby switching the operation of the drive motor 63 from the high speed to the low speed windings while the drive motor is decelerating to zero speed.

Current limiting device 106 is provided to limit the current taken by drive motor 63, and may be of any well known type in which the device is adjusted to operate at the limiting current, thereby breaking a circuit through its contacts. For simplicity of description, current limiting device 106 is illustrated as an electromagnet 107 electrically connected in series with a line from the three phase power mains which is directly connected to the stator windings 76, 78 of drive motor 63. The force of the said magnet attracts its armature 108, thereby breaking the circuit between the armature 108 and contact 109. Restraining spring 110 tends to keep armature 108 in engagement with contact 109 in opposition to the force exerted by electromagnet 107, and the armature 108 and contact 109 are electrically connected in the circuit of control motor 91. When the current in the drive motor stator circuit increases to the value at which the device 106 is adjusted to operate, the magnetic force of electromagnet 107 will overcome the restraining force of spring 110, thus breaking the circuit between armature 108 and contact 109, and thereby opening the circuit of control motor 91. Opening the control motor circuit reduces the torque of the control motor 91 to zero, so that the restoring force of preloaded spring 93 will drive the contact arm 85 of auto-transformer 82 toward the Y point 84, thus increasing the resistance of the drive motor rotor circuit, and thereby decreasing the current in the drive motor stator circuit. When the current in the drive motor stator circuit has decreased to a value below the operating value of device 106, the restraining force of spring 110 will overcome the magnetic force of electromagnet 107, which causes armature 108 to engage contact 109, and thereby reconnect control motor 91 to the contacts of the reversing switching mechanism 62. Three single phase induction regulators connected in Y relation may be used in place of the three winding auto transformer 82, in which case operation of the control motor 91 drives the induction regulators, thereby increasing the voltage applied to resistors 88 in a manner similar to auto-transformer 82.

Figure 2 is a modification of the control system of this invention in which auto-transformer 82 and resistors 88 are replaced by a rheostat 111 which may be a carbon pile or any other suitable type, preferably one in which may steps of resistance can be obtained. It consists of three resistance units 112 connected in Y relation at 113, the brushes 86 of contact arm 85 making contact with the resistance taps. Operation of the control motor 91 drives the contact arm 85 toward the Y point 113, which decreases the resistance of the drive motor rotor circuit, and thereby increases the torque of the drive motor 63. If rheostat 111 is of the carbon pile type, operation of control motor 91 will increase the pressure between the ends of the carbon elements, which will decrease the resistance of the pile, thereby decreasing the resistance in the drive motor rotor circuit.

Although a specific embodiment has been described above, it is to be understood that the invention is to be in no way limited thereby, but is susceptible to various changes in form and detail within the scope of the appended claims.

We claim:

1. In a system for controlling a controlled element with a controlling element, the combination of a driving motor for said controlled element, a reversing switch for controlling said motor and jointly operated thereby and by said controlling element, and an autotransformer actuated in accordance with the movement of said motor for controlling the resistance in the circuits of the said motor.

2. In a system for controlling a controlled element with a controlling element, the combination of a driving motor for said controlled element, a reversing switch for controlling said motor and jointly operated thereby and by said controlling element, and an autotransformer actuated in accordance with the speed of said motor for adjusting the resistance in the circuits thereof.

3. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, a transformer for adjusting the resistance in the circuit of said motor, a switch to connect the said sets of windings to a source of voltage and to the said transformer, and means responsive to movement of one of said elements for operating the last-named switch.

4. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, a transformer for adjusting the resistance in the circuit of said motor, a switch to connect the said sets of motor windings to a source of voltage and to the said transformer, and means responsive to speed of one of said elements for actuating the last-named switch.

5. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, a switch to change connections to the said sets of motor windings, means responsive to movement of said motor for actuating said last named switch, and electrical means responsive to movement of one of said elements for controlling said motor independently of said switches.

6. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, a switch to change connections to the said sets of motor windings, means responsive to movement of said motor for actuating said last named switch, and electrical means responsive to the speed of one of said elements for controlling said motor independently of said switches.

7. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, an auto-transformer for adjusting the resistance in the circuit of said motor controlled by one of said elements, a switch to connect the said sets of motor windings to a source of voltage and to the said auto-transformer, and means responsive to the movement of said motor for actuating said last named switch.

8. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, an auto-transformer for adjusting the resistance in the circuit of said motor responsive to the movement of said motor, a switch to connect the said sets of motor windings to a source of voltage and to the said auto-transformer, and means responsive to the movement of said motor for actuating said last named switch.

9. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, an auto transformer for adjusting the resistance in the circuit of said motor, a switch to connect the said sets of motor windings to a source of voltage and to said auto-transformer, means responsive to the movement of said motor for actuating said last named switch, and means responsive to the speed of one of the elements for actuating said auto-transformer.

10. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, an auto-transformer for adjusting the resistance in the circuit of said motor, a switch to connect the said sets of windings to a source of voltage and to said auto-transformer, means responsive to the movement of said motor for actuating said last named switch, and means responsive to the speed of the driven element for actuating said auto-transformer.

11. In a system for controlling a controlled element with a controlling element, the combination of a reversible driving motor for said controlled element having two sets of windings, a reversing switch controlling said motor and having two sets of cooperating movable contacts, driving connections between one set of contacts and said motor, operative connections between said controlling element and said other set of contacts, an auto-transformer for adjusting the resistance in the circuit of the said motor, a switch to connect the said sets of motor windings to the said auto-transformer and to a source of voltage, a relay for the said last switch, means responsive to the speed of the said motor for actuating said relay, and means responsive to movement of one of the said elements for controlling said auto-transformer.

12. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto-transformer for the said motor and actuated thereby and having movable contactors, and resistors connected to the said contactors, whereby the resistance in a circuit of the said motor is changed.

13. In a system for controlling a controlled element with a controlling element, the combination of a reversible driving motor for said controlled element, a reversing switch controlling said motor and having two sets of cooperating movable contacts, driving connections between one set of contacts and said motor, operative connections between said controlling element and said other set of contacts, an auto-transformer in the rotor circuit of the said motor and having movable contactors, resistors connected to said contactors for varying the resistance in the said motor rotor circuit, and means responsive to movement of one of said elements for actuating said contactors.

14. In a system for controlling a controlled element with a controlling element, the combination of a reversible driving motor for said controlled element having two sets of windings, an auto-transformer for adjusting the resistance in the circuit of the said motor, a reversing switch controlling said motor and having two sets of cooperating movable contacts, driving connections between one set of contacts and said motor, operative connections between said controlling element and said other set of contacts, a source of voltage supply connected to said contacts, a switch interposed between said auto transformer and said two sets of motor windings for alternatively connecting said auto-transformer to one of said sets of motor windings, means responsive to the movement of one of said elements for actuating said auto-transformer, and means responsive to the speed of the said motor for actuating the said last-named switch.

15. In a system for controlling a controlled element with a controlling element, the combination of a reversible driving motor for said controlled element having two sets of windings whereby two operating speed ranges may be obtained, a reversing switch controlling the said motor and having two sets of cooperating movable contacts, driving connections between one set of contacts and said motor, operative connections between said controlling element and said other set of contacts, an auto transformer for said motor having contactors, resistors connected to the said contactors, a switch for changing the connections to the said sets of windings, a relay for the said switch, means responsive to the speed of the said motor for actuating the said relay, and means responsive to the movement of the said motor for controlling the said contactors to adjust the resistance in the circuit of said motor.

16. In a system for controlling a controlled element with a controlling element, the combination of a reversible driving motor for said controlled element having two sets of windings, a reversing switch controlling the said motor and having two sets of cooperating movable contacts, driving connections between one set of contacts and said motor, operative connections between said controlling element and said other set of contacts, an auto transformer for adjusting the resistance in the circuit of said motor having contactors, resistors connected to the said contactors, a switch for changing the connections to the said set of windings, a relay for the said switch, a second switch responsive to the speed of the said motor for actuating said relay, and an auxiliary motor in the circuit of said first motor for actuating said contactors.

17. In a system for controlling a controlled element with a controlling element, the combination of a reversible driving motor for said controlled element having two sets of windings, a reversing switch controlling the said motor and having two sets of cooperating movable contacts, driving connections between one set of contacts and said motor, operative connections between said controlling element and said other set of contacts, an auto transformer for adjusting the resistance in the circuit of said motor having contactors, resistors connected to the said contactors, a switch for changing the connections to the said sets of windings, a relay for the said switch, a second switch responsive to the speed of the said motor for actuating said relay, an auxiliary motor in the circuit of said first motor for actuating said contactors, and means responsive to a predetermined current value in the circuit of said first motor for de-energizing said auxiliary motor.

18. In a system for controlling a controlled element with a controlling element, the combination of a reversible driving motor for said controlled element having two sets of windings, a reversing switch controlling the said motor and having two sets of cooperating movable contacts, driving connections between one set of contacts and said motor, operative connections between said controlling element and said other set of of contacts, resistors in the circuit of said motor and having movable contactors whereby the resistance in the motor circuit may be varied, a switch for changing the connections to the said sets of motor windings, means responsive to the speed of the said motor for actuating the said switch, and means responsive to the movement of one of said elements for actuating the said contactors.

19. In a system for controlling a controlled element with a controlling element, the combination of a driving motor for said controlled element, a reversing switch having two movable parts, a pilot motor, means drivingly connecting said pilot motor to one of said parts, means for governing said pilot motor from said controlling element, means drivingly connecting the other movable part of said switch to said driving motor, means connecting said reversing switch to said driving motor to energize the same, and an auto-transformer to vary the resistance of the driving motor in proportion to the speed thereof.

20. In a system for controlling a controlled element, with a controlling element, the combination of a high torque driving motor for said controlled element, a reversing switch having two movable parts, a low torque pilot motor, means drivingly connecting said pilot motor to one of said parts, means for governing said pilot motor from said controlling element, means drivingly connecting the other movable part of said switch to said driving motor, means connecting said reversing switch to said driving motor to energize the said driving motor, and an auto-transformer to vary the resistance of the driving motor in proportion to the speed thereof.

21. In a system for controlling a controlled element with a controlling element, the combination of a low torque pilot motor, a two speed, two winding, wound rotor induction type driving motor having an acceleration greater than said pilot motor, a reversing switch having two movable parts, means drivingly connecting said pilot motor to one of said parts, means for governing said pilot motor from said controlling element, means drivingly connecting the other part of said switch to said driving motor, means connecting said reversing switch to said driving motor to energize the driving motor, and transformer means to vary the current through the said driving motor in proportion to the speed thereof.

ARTHUR P. DAVIS.
GEORGE AGINS.

REFERENCES CITED

The following references are of record in the file of this patent:

UNITED STATES PATENTS

| Number | Name | Date |
|---|---|---|
| 2,115,086 | Riggs | Apr. 26, 1938 |
| 2,163,632 | Satterlee | June 27, 1939 |
| 2,114,248 | Davis | Apr. 12, 1938 |

FOREIGN PATENTS

| Number | Country | Date |
|---|---|---|
| 702,932 | France | Feb. 2, 1931 |